United States Patent
Kim et al.

(10) Patent No.: US 8,463,737 B2
(45) Date of Patent: Jun. 11, 2013

(54) REALTIME UNIFICATION MANAGEMENT INFORMATION DATA CONVERSION AND MONITORING APPARATUS AND METHOD FOR THEREOF

(75) Inventors: Byung Seop Kim, Yongin-si (KR); Chi Hoon Lee, Suwon-si (KR); Cheol Ju Kang, Yongin-si (KR); Jae Hee Park, Busan (KR); Chi Hoon Park, Yongin-si (KR); Sung Hwa Ryu, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 232 days.

(21) Appl. No.: 12/524,248

(22) PCT Filed: Apr. 11, 2007

(86) PCT No.: PCT/KR2007/001757
§ 371 (c)(1),
(2), (4) Date: Dec. 10, 2009

(87) PCT Pub. No.: WO2008/091037
PCT Pub. Date: Jul. 31, 2008

(65) Prior Publication Data
US 2010/0145950 A1    Jun. 10, 2010

(30) Foreign Application Priority Data
Jan. 26, 2007 (KR) .................. 10-2007-0008372

(51) Int. Cl.
*G06F 7/00* (2006.01)
*G06F 17/30* (2006.01)

(52) U.S. Cl.
USPC ............... 707/602; 707/756; 707/811

(58) Field of Classification Search
USPC ................... 707/602, 756, 804, 746, 811
See application file for complete search history.

(56) References Cited

U.S. PATENT DOCUMENTS

| | | | |
|---|---|---|---|
| 5,491,796 A | 2/1996 | Wanderer et al. | |
| 5,533,116 A | 7/1996 | Vesterinen | |
| 5,742,762 A | 4/1998 | Scholl et al. | |
| 6,820,135 B1 * | 11/2004 | Dingman et al. | 709/246 |
| 6,947,943 B2 * | 9/2005 | DeAnna et al. | 717/120 |
| 2002/0065822 A1 * | 5/2002 | Itani | 707/7 |
| 2002/0173997 A1 * | 11/2002 | Menard et al. | 705/7 |
| 2005/0038567 A1 * | 2/2005 | Maeda et al. | 700/276 |

FOREIGN PATENT DOCUMENTS

| | | |
|---|---|---|
| JP | 10293704 A | 11/1998 |
| JP | 2000215130 A | 8/2000 |
| JP | 2000339195 A | 12/2000 |
| KR | 1020030022603 A | 3/2003 |
| KR | 1020030028074 A | 4/2003 |
| KR | 1020040051114 A | 6/2004 |

* cited by examiner

*Primary Examiner* — James E Richardson
(74) *Attorney, Agent, or Firm* — The Webb Law Firm

(57) ABSTRACT

Provided are an apparatus and method for converting and monitoring management information data in an integrated manner and in real time. More particularly, the present invention relates to an apparatus and method for converting and monitoring management information data in an integrated manner and in real time which are capable of reducing the number of processes and stably operating an IT infrastructure through integrated management by flexibly collecting and converting management information data having a variety of formats and transmitting it to a destination integrated management solution when existing point-specific management solutions are managed in an integrated manner using an integrated management solution.

16 Claims, 2 Drawing Sheets

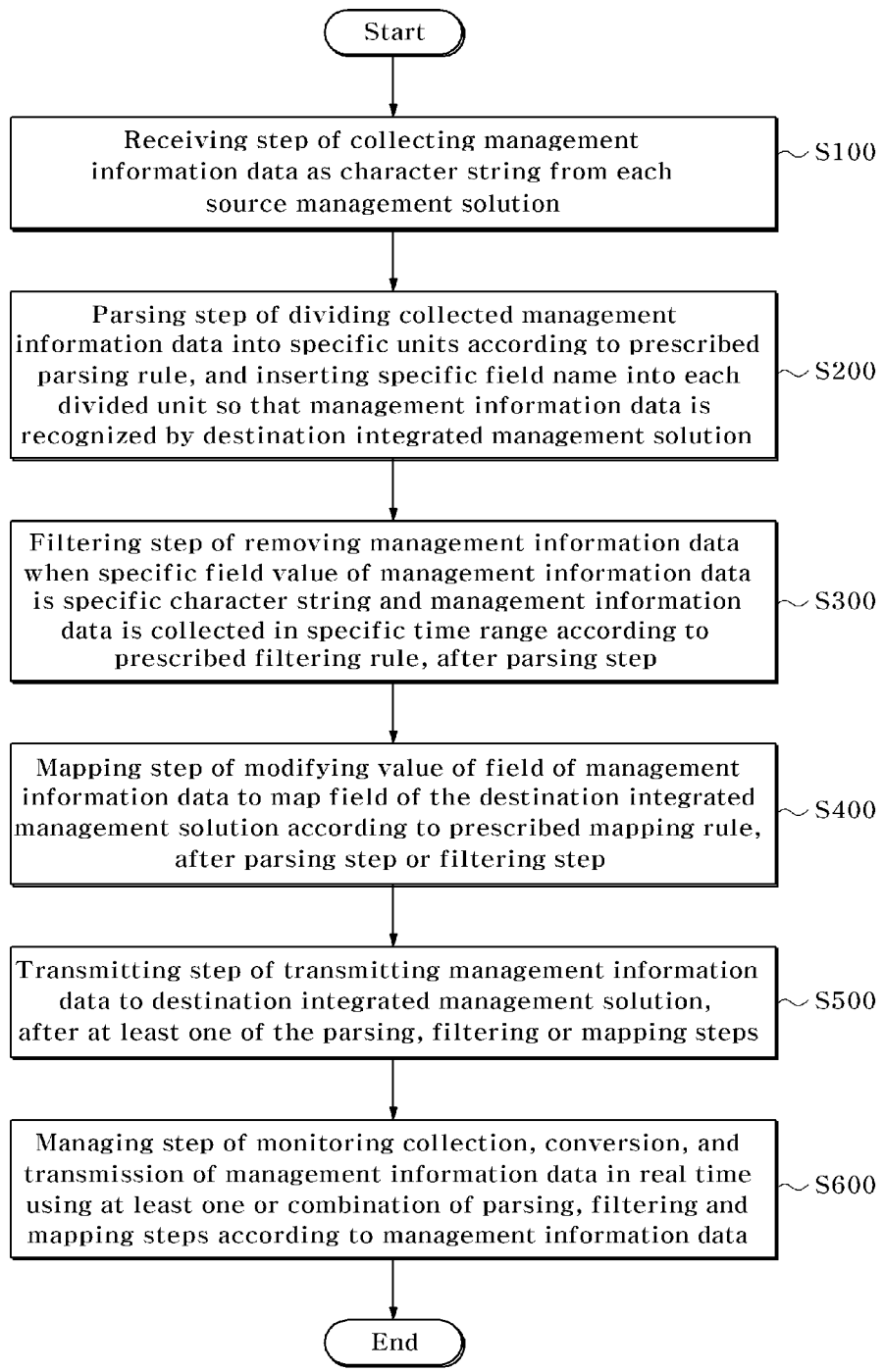

REALTIME UNIFICATION MANAGEMENT INFORMATION DATA CONVERSION AND MONITORING APPARATUS AND METHOD FOR THEREOF

TECHNICAL FIELD

The present invention relates to an apparatus and method for converting and monitoring management information data in an integrated manner and in real time. More particularly, the present invention relates to an apparatus and method for converting and monitoring management information data in an integrated manner and in real time which are capable of reducing the number of processes and stably operating an IT infrastructure through integrated management by flexibly collecting and converting management information data having a variety of formats and transmitting it to a destination integrated management solution when existing point-specific management solutions are managed in an integrated manner using an integrated management solution.

BACKGROUND ART

In general, information technology (IT) is used in offices to facilitate smooth operation of a primary task processor. IT has evolved into an infrastructure that unifies several distributed structures into one.

In recent years, a great deal of effort has gone towards building an IT infrastructure for an enterprise's overseas branches. Such an IT infrastructure is to support an integrated solution for performing related processes, such as production, sales, marketing, export, and accounting. And, there is a need for organic integration and fault management.

However, an IT infrastructure is conventionally managed by individual managers through a solution for each management point (e.g., production facility management, system management (SMS), DB management, network management, application management). Also, task processes are organically connected. Accordingly, while faults may be recognized by individual management solutions, it is difficult to recognize causes of a complex fault (occurring in several points).

Further, modules must be modified each time an introduced integrated management solution and an associated solution have a different management information format or a management policy is changed.

In a conventional technique, in order to associate a variety of management information of existing point-specific management solutions with one another through an integrated management solution, such as MAXIGENT, a program for converting management information from point-specific management solutions is used. Management information converted using data obtained by parsing a solution log is collected by the integrated management solution without being processed.

This conventional technique has the following problems.

First, since there is no user interface (UI) capable of monitoring all management-information-data converting modules of the point-specific management solutions, it is impossible to check which management information of the solution is collected and whether data is sent normally.

Second, when a data conversion technique is modified due to change in an integrated management policy, management-information converting modules of point-specific management solutions must be all modified.

Third, while specific management solutions report faults at each point, it is difficult to discover interrelations between faults. Accordingly, it is very difficult to recognize causes of faults, which degrades production and service.

DISCLOSURE OF INVENTION

Technical Problem

It is an object of the present invention to provide an apparatus and method for converting and monitoring management information data in an integrated manner and in real time which are capable of associating an existing point-specific management solution with an integrated management solution by flexibly collecting and converting management information data.

It is another object of the present invention to provide an apparatus and method for converting and monitoring management information data in an integrated manner and in real time which are capable of monitoring, on a chart or graph in real time, which management information of a solution is currently normally collected, converted, and transmitted through a graphic user interface (GUI).

It is still another object of the present invention to enable an existing integrated management solution, such as MAXIGENT, to monitor production facility, service facility, and the like, as well as IT infrastructure resources, for omnidirectional integrated management in production and service tasks.

It is yet another object of the present invention to provide an environment capable of monitoring organic production and service processes by unifying all factors (e.g., server, program, facility, database, and the like) affecting a task process through an integrated control system so that actual tasks of an enterprise are collectively monitored, and to recognize interaction of factors (e.g., server, program, facility, database, and the like) affecting production and service processes so that a user can rapidly cope with a fault.

Technical Solution

According to a first aspect of the present invention, there is provided an apparatus for converting and monitoring management information data in an integrated manner and in real time, the apparatus comprising: a receiving module for collecting the management information data as a character string from source management solutions; a parsing module for receiving the management information data from the receiving module, dividing the management information data into specific units according to a prescribed parsing rule, inserting a specific field name into each divided unit so that the management information data is recognized by a destination integrated management solution, and outputting the resultant management information data; a filtering module for receiving each unit of management information data from the parsing module and removing the management information data when a specific field value of the management information data is a specific character string and the management information data is collected in a specific time range according to a prescribed filtering rule; a mapping module for receiving the management information data from the parsing module or the filtering module and modifying a value of a field of the management information data to map a field of the destination integrated management solution according to a prescribed mapping rule; a transmitting module for transmitting the management information data from at least one of the parsing, filtering or mapping modules to the destination integrated management solution; and a managing module for setting the parsing, filtering and mapping rules, and monitoring collection, conversion, and transmission of the management information data in real time using at least one or a combination of the parsing, filtering and mapping modules according to the management information data.

The source management solution may be a point-specific management solution comprising a system management solution, a database management solution, a network management solution, a facility management solution, and an application management solution.

Management information data from the system management solution may comprise at least one of a CPU usage rate, a memory usage rate, and a storage capacity, management information data from the database management solution may comprise database operation information or database storage capacity, management information data from the network management solution may comprise network-device operation information or network device load factor, management information data from the facility management solution may comprise conveyer operation information or an indoor temperature, and management information data from the application management solution may comprise webpage access speed or webpage user number.

The receiving module may collect or socket-listen each unit of management information data through TCP socket communication.

Dividing the management information data into specific units may comprise dividing the management information data into specific character strings, indexes or a combination thereof.

The management information data may be removed when a specific field value of the management information data is a specific character string and the management information data is collected in a specific time range according to the filtering rule.

The transmitting module may transmit each unit of management information data to the destination integrated management solution through TCP socket communication.

The managing module may comprise a graphic user interface (GUI), and monitor processes on a chart or graph in a specific period.

The managing module may reset the parsing, filtering and mapping rules when an integrated management policy is changed.

The destination integrated management solution may be a MAXIGENT integrated management solution.

According to a second aspect of the present invention, there is provided a method for monitoring processes using collecting, conversing, and transmitting devices in a real time so that a destination integrated management solution manages management information data from each source management solution in an integrated manner, the method comprising: (a) a receiving step of collecting the management information data as a character string from each source management solution; (b) a parsing step of dividing the collected management information data into specific units according to a prescribed parsing rule, and inserting a specific field name into each divided unit so that the management information data is recognized by the destination integrated management solution; (c) a filtering step of removing the management information data when a specific field value of the management information data is a specific character string and the management information data is collected in a specific time range according to a prescribed filtering rule, after the parsing step; (d) a mapping step of modifying a value of a field of the management information data to map a field of the destination integrated management solution according to a prescribed mapping rule, after the parsing step or the filtering step; (e) a transmitting step of transmitting the management information data to the destination integrated management solution, after at least one of the parsing, filtering or mapping steps; and (f) a managing step of monitoring collection, conversion, and transmission of the management information data in real time using at least one or a combination of the parsing, filtering and mapping steps according to the management information data.

The receiving step may comprise the step of collecting or socket-listening each unit of management information data through TCP socket communication.

The parsing step may comprise the step of dividing the management information data into specific character strings, indexes or a combination thereof.

The filtering step may comprise the step of removing management information data when a specific field value of the management information data is a specific character string and the management information data is collected in a specific time range according to the filtering rule.

The transmitting step may comprise the step of transmitting each unit of management information data to the destination integrated management solution through TCP socket communication.

The managing step may comprise the step of monitoring processes on a chart or graph in a specific period through a graphic user interface (GUI).

The managing step may comprise the step of resetting the parsing, filtering and mapping rules when an integrated management policy is changed.

Advantageous Effects

According to the apparatus and method for converting and monitoring management information data in an integrated manner and in real time of the present invention, a manager or person in charge can monitor a management information converting module using existing point-specific management solutions on one screen. Thus, it is possible to check which management information from a solution is normally collected, converted and transmitted. It is also possible for the manager to easily change the management information converting rule through the graphic user interface (GUI) when an integrated management policy is changed. Thus, integrated management can operate more stably.

Furthermore, according to the present invention, since existing monitoring systems (e.g., system management (SMS), DB management, and network management applications) are operated in an integrated manner, cost can be reduced. All factors (e.g., server, program, facility, network, database, and the like) affecting production and service are organically integrated, thereby revealing causes of faults not revealed by a method of individually monitoring factors of an operating process (e.g., a server, a program, a facility, a database, and the like). Thus, operating process interruption can be minimized and process stability improved.

BRIEF DESCRIPTION OF THE DRAWINGS

FIG. 2 is a flowchart illustrating a method for converting and monitoring management information data in an integrated manner and in real time according to an exemplary embodiment of the present invention.

MODE FOR THE INVENTION

Figure 1:
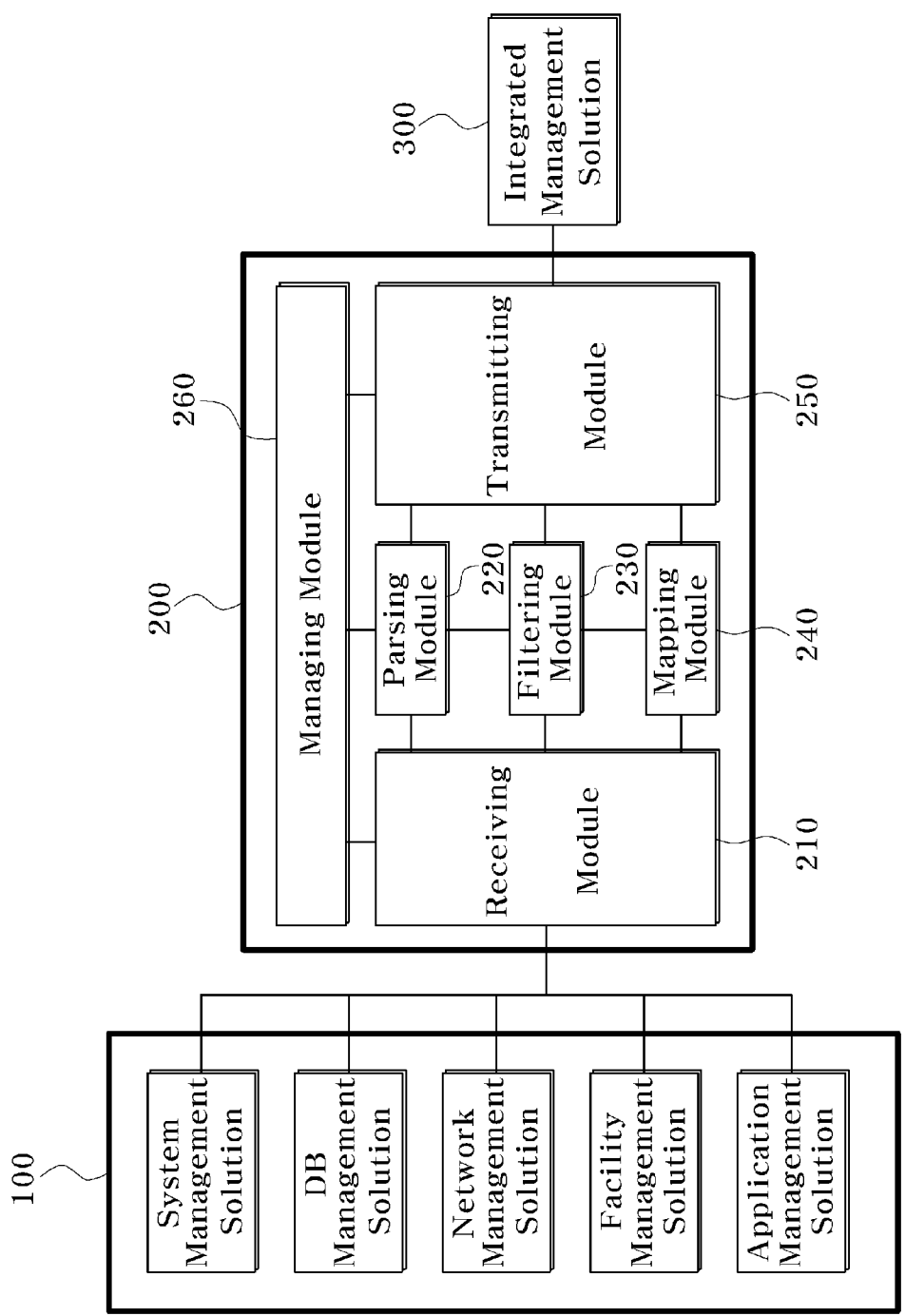
FIG. 1 is a block diagram illustrating an apparatus for converting and monitoring management information data in an integrated manner and in real time according to an exemplary embodiment of the present invention.

Hereinafter, exemplary embodiments of the present invention will be described in detail. However, the present invention is not limited to the exemplary embodiments disclosed below, but can be implemented in various alternative forms. The present exemplary embodiments are described to fully enable those of ordinary skill in the art to embody and practice the invention.

FIG. 1 is a block diagram illustrating an apparatus for converting and monitoring management information data in an integrated manner and in real time according to an exemplary embodiment of the present invention.

Referring to FIG. 1, the apparatus 200 for converting and monitoring management information data in an integrated manner and in real time according to an exemplary embodiment of the present invention comprises a receiving module 210, a parsing module 220, a filtering module 230, a mapping module 240, a transmitting module 250, and a managing module 260.

The receiving module 210 collects management information data as a character string from a source management solution.

The source management solution is a point-specific management solution, including a System Management System (SMS) solution (e.g., IBM Tivoli, CA Unicenter, BMC Patrol, etc.), a database (DB) management solution (e.g., Toad, Orange, etc.), a network management solution (e.g., HP OpenView, Infranics SysMaster, etc.), a facility management solution (e.g., eMTS, FDC, etc.), and an application management solution (e.g., Jennifer), etc.

Management information data from the SMS solution includes, for example, a CPU usage rate, a memory usage rate, a storage capacity, or the like. Management information data from the DB management solution includes, for example, DB operation information, DB storage capacity, or the like. Management information data from the network management solution includes, for example, network-device operation information, network-device load factor, or the like. Management information data of the facility management solution includes, for example, conveyer operation information, indoor temperature, or the like. Management information data from the application management solution includes, for example, webpage access speed, webpage user number, or the like.

Meanwhile, the receiving module 210 can collect or socket-listen the management information data through Transmission Control Protocol (TCP) socket communication.

The management information data is collected by a method of receiving the management information data from a destination integrated management solution such as MAXIGENT in one direction via socket communication (e.g., TCP), a method of receiving the management information data from a management-information transmitting module of each point management solution produced by an Application Programming Interface (API) of the MAXIGENT via socket communication, or a method of receiving the management information as a result of periodically executing database, log, shell, and the like through a MAXIGENT interface manager agent at a specific host. One of the methods may be selected according to features of the management solution.

The parsing module 220 receives management information data as a character string from the receiving module 210 and divides it into specific units according to a prescribed parsing rule, inserts a specific field name (variable name) into the divided units so that a destination integrated management solution such as MAXIGENT recognizes the management information data, and outputs the resultant management information data.

Specifically, when the management information data from the point management solution is received by the receiving module 210, TCP socket communication is used. Accordingly, the management information data is a character string. Specific units (which differ from management solution to management solution) of the character string have meaning.

The parsing rule is defined for division of the character string into the units and insertion of a management information field name (variable name) into the units so that the integrated management solution such as MAXIGENT recognizes the management information data. The parsing rule is used upon mapping, filtering, or transmitting the management information.

There are three methods for dividing the management information into the units. A first method is to divide the management information into specific character units. For example, when the character string is 'CPU^^CPU usage high^^20060910', it is divided into units by '^^'. That is, the character string is divided into 'CPU', 'CPU usage high', and '20060910'. A management information field name required for the integrated management solution, such as MAXIGENT, is inserted into the units.

A second method is to divide the management information into specific index units. For example, when the received character string is 'DB001003121917', each character having the same length, it is divided into units of indexes 2, 3, 3 and 6. That is, 'DB001003121917' is divided into 'DB', '001', '003', and '121917', and a management information field name required for the MAXIGENT integrated management solution is inserted into the units.

A third method is to use a combination of the above two methods.

Meanwhile, the managing module 260 can provide a screen for enabling the parsing module to, through a graphic user interface (GUI), divide the management information data as a character string into units according to the parsing rule and to insert a management information field name (variable name) recognized by the integrated management solution such as MAXIGENT into the units.

The filtering module 230 receives the management information data from the parsing module 220. The filtering module 230 removes the management information data when a specific field value of the management information data is a specific character string, and the management information data is collected in a specific time range according to a prescribed filtering rule.

The filtering rule defines the conditions, such as when a specific field value of management information data is a specific character string (Regular expression is possible), when the management information data is collected in a specific time range, or when the specific field value is the specific character string and the management information data is collected in a specific time range, and does not send the management information data to the destination integrated management solution when the condition(s) is satisfied.

All the management information data from the point-specific management solution are not necessarily required for the integrated management solution, such as MAXIGENT. For example, a specific enterprise may shut down a database for one hour at night, and this should not be reported as a fault on an integrated management screen. Further, when a specific field value of the management information data is, for example, a character string indicating "normal", such management information data may not need to be visible on the integrated management screen.

When the management information data is collected in a specific time range or a specific field value thereof is an operator-specified character string as described above, the management information data may not need to be transmitted to the MAXIGENT integrated management solution. By setting this condition at the graphic user interface (GUI) of the managing module 260 and providing a necessary point management solution processing logic, i.e., the filtering module 230, the management information data is deleted and not processed.

In the embodiment of the present invention, the filtering module 230 is preferably located next to the parsing module 220. However, the present invention is not limited to such a configuration, and the filtering module may be located next to the receiving module 210.

The mapping module 240 receives the management information data from the parsing module 220 or the filtering module 230, modifies a field value of the management information data to match a field of the destination integrated management solution, such as MAXIGENT, according to a prescribed mapping rule, and outputs the resultant management information data.

The mapping rule enables specification of a value of a specific field or another field of management information data when the specific field value is a specific character string (Regular expression is possible).

Specifically, since the field of the management information data from each point management solution does not map the field of the management information data for the destination integrated management solution, such as MAXIGENT, in one to one correspondence, the management information data from each point management solution passing through the parsing module 220 or the filtering module 230 does not come to complete MAXIGENT management information data.

Therefore, the mapping rule instructs to parse the management information data and insert a lack field value into the management information data. Here, the lack field value may be simply a constant, or a value dependent on a value condition of a specific field. Such a field value can be input on the graphic user interface (GUI) of the managing module 260.

The transmitting module 250 transmits the management information data from at least one of the parsing module 220, the filtering module 230, and the mapping module 240 to the destination integrated management solution, such as MAXIGENT.

That is, the transmitting module 250 can transmit the converted management information data to the integrated management solution specified by a manager, through the TCP socket, or insert it into a specific table of the database. It will be easily appreciated that the transmitting module 250 may transmit the management information data to a plurality of destination integrated management solutions, if necessary.

The managing module 260 sets the parsing, filtering and mapping rules, and monitors the collection, conversion, and transmission of the management information data in real time, using at least one or a combination of the parsing module 220, the filtering module 230, and the mapping module 240 according to the management information data.

The graphic user interface (GUI) can set the parsing/mapping/filtering rules to be applied to the management information data as a character string from the receiving module 210, and the manager can combine the rules for each management solution to convert the management information data.

The managing module 260 may dynamically arrange the rule of processing and converting the management information data. That is, a user may arrange and apply the set rules as necessary according to a format of the management information data from each point management solution.

Furthermore, the arranged rules are not fixed but can be freely inserted/deleted on the graphic user interface (GUI) using the management information data processing logic of the point management solution.

Meanwhile, the managing module 260 can monitor a procedure of processing the management information data, in real time. In the conventional structure in which each unit of management information data is converted by a separate program as described above, one graphic user interface (GUI) cannot monitor the procedure. Accordingly, it is impossible to check which management information data from a point management solution is not managed in an integrated manner due to malfunction of a specific converting program.

The graphic user interface (GUI) of the managing module 260 can not only start and stop the procedure of processing management information data from each point management solution, but also monitor, in real time, processes of receiving, processing and transmitting the management information data on a chart or graph in a specific period.

According to the apparatus 200 for converting and monitoring management information data in an integrated manner and in real time according to an exemplary embodiment of the present invention, management information data having several formats are all collected, processed and converted into management information data having a format required for the destination integrated management solution such as MAXIGENT, and transmitted through TCP socket communication. Thus, all points of the IT infrastructure are managed by the MAXIGENT integrated management solution, unlike in a conventional technique of using a separate program for each point management solution.

In addition, the graphic user interface (GUI) of the managing module 260 can monitor the management information data on the chart or graph to check whether it is normally processed by each point management solution.

FIG. 2 is a flowchart illustrating a method for converting and monitoring management information data in an integrated manner and in real time according to an exemplary embodiment of the present invention.

Referring to FIG. 2, first, the receiving module 210 (see FIG. 1) collects management information data having several formats as a character string from the source management solution 100 (see FIG. 1), i.e., the point-specific management solution (S100).

The parsing module 220 (see FIG. 1) then divides the management information data as the character string collected in step S100 into specific units according to the prescribed parsing rule and inserts a specific field name into the divided units so that the management information data is recognized by the destination integrated management solution, such as MAXIGENT (S200).

The filtering module 230 (see FIG. 1) removes management information data when a specific field value of the management information data is a specific character string or the management information data is collected in a specific time range according a prescribed filtering rule (S300).

The mapping module 240 (SEE FIG. 1) then modifies the field value of the management information data to map the field of the destination integrated management solution, such as MAXIGENT, according to the prescribed mapping rule (S400).

The transmitting module 250 then transmits the management information data passing through at least one of steps S200, S300 and S400 to the destination integrated management solution, such as MAXIGENT (S500).

Finally, the processes of collecting, converting, and transmitting the management information data are monitored in real time by applying at least one or a combination of steps S200, S300 and S400 according to the management information data (S600).

As described above, the present invention provides the apparatus and method aiming at providing an interface function for allowing easier association of the integrated management solution with existing point management solutions in managing an IT infrastructure of an enterprise using the integrated management solution such as MAXIGENT in an integrated manner. A manager is allowed to define and apply, through a graphic user interface (GUI), a technique of collecting management information data from the existing point-specific management solutions, and a task of converting the management information data. Accordingly, the management information having a variety of formats can be flexibly converted by the destination integrated management solution such as MAXIGENT, so that MAXIGENT manages the IT infrastructure of an enterprise in an integrated manner.

According to the present invention, processes which have been separately managed for respective points (e.g., SMS, DB, network, application) can be integrated more easily and flexibly, thereby reducing the number of processes and stably operating the IT infrastructure through the integrated management.

Meanwhile, the method for converting and monitoring management information data in an integrated manner and in real time according to the exemplary embodiment of the present invention may be implemented as a computer code on a computer-readable recording medium. The computer-readable recording medium may be any recording medium capable of storing computer data.

For example, examples of the computer-readable recording medium include a read only memory (ROM), a random access memory (RAM), a compact disk-read only memory (CD-ROM), a magnetic tape, a hard disk, a floppy disk, a mobile storage, a flash memory, an optical data storage, etc. Furthermore, the computer-readable recording medium may be carrier waves (e.g., transmission over the Internet).

The computer-readable recording medium may be distributed among computer systems connected via a network, and the method may be stored and executed as distributed code segments.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for converting and monitoring management information data in an integrated manner and in real time, the apparatus comprising at least one computer system including at least one processor, the at least one computer system comprising:
   a receiving module for collecting the management information data as a character string from at least one source management solution;
   a parsing module for receiving the management information data from the receiving module, dividing the management information data into specific units according to a prescribed parsing rule, inserting a specific field name into each divided unit in addition to the management information data of that divided unit so that the management information data is recognized by a destination integrated management solution, and outputting the resultant management information data;
   a filtering module for receiving each unit of management information data from the parsing module and removing the management information data when a specific field value of the management information data is a specific character string and the management information data is collected in a specific time range according to a prescribed filtering rule;
   a mapping module for receiving the management information data from the parsing module or the filtering module and modifying a value of a field of the management information data to map a field of the destination integrated management solution according to a prescribed mapping rule;
   a transmitting module for transmitting the management information data from at least one of the parsing, filtering or mapping modules to the destination integrated management solution; and
   a managing module for setting the parsing, filtering and mapping rules, and monitoring collection, conversion, and transmission of the management information data in real time using at least one or a combination of the parsing, filtering and mapping modules according to the management information data, and wherein the managing module resets the parsing, filtering and mapping rules when an integrated management policy is changed.

2. The apparatus according to claim 1, wherein the at least one source management solution is a point-specific management solution comprising a system management solution, a database management solution, a network management solution, a facility management solution, and an application management solution.

3. The apparatus according to claim 2, wherein management information data from the at least one system management solution comprises at least one of a CPU usage rate, a memory usage rate, and a storage capacity,
   management information data from the database management solution comprises database operation information or database storage capacity,
   management information data from the network management solution comprises network-device operation information or network device load factor,
   management information data from the facility management solution comprises conveyer operation information or an indoor temperature, and
   management information data from the application management solution comprises webpage access speed or webpage user number.

4. The apparatus according to claim 1, wherein the receiving module collects or socket-listens each unit of management information data through TCP socket communication.

5. The apparatus according to claim 1, wherein dividing the management information data into specific units comprises dividing the management information data into specific character strings, indexes or a combination thereof.

6. The apparatus according to claim 1, wherein the management information data is removed when a specific field value of the management information data is a specific character string and the management information data is collected in a specific time range according to the filtering rule.

7. The apparatus according to claim 1, wherein the transmitting module transmits each unit of management information data to the destination integrated management solution through TCP socket communication.

8. The apparatus according to claim 1, wherein the managing module comprises a graphic user interface (GUI), the managing module monitoring processes on a chart or graph in a specific period.

9. The apparatus according to claim 1, wherein the destination integrated management solution includes an Application Programming Interface (API).

10. A method for monitoring processes using collecting, converting, and transmitting devices in a real time so that a destination integrated management solution manages management information data from at least one source management solution in an integrated manner, the method comprising:
(a) a receiving step of collecting the management information data as a character string from the at least one source management solution;
(b) a parsing step of dividing the collected management information data into specific units according to a prescribed parsing rule, and inserting a specific field name into each divided unit in addition to the management information data in each divided unit so that the management information data is recognized by the destination integrated management solution;
(c) a filtering step of removing the management information data when a specific field value of the management information data is a specific character string and the management information data is collected in a specific time range according to a prescribed filtering rule, after the parsing step;
(d) a mapping step of modifying a value of a field of the management information data to map a field of the destination integrated management solution according to a prescribed mapping rule, after the parsing step or the filtering step;
(e) a transmitting step of transmitting the management information data to the destination integrated management solution, after at least one of the parsing, filtering or mapping steps; and
(f) a managing step of monitoring collection, conversion, and transmission of the management information data in real time using at least one or a combination of the parsing, filtering and mapping steps according to the management information data, and wherein the managing step comprises the step of resetting the parsing, filtering and mapping rules when an integrated management policy is changed.

11. The method according to claim 10, wherein the receiving step comprises the step of collecting or socket-listening each unit of management information data through TCP socket communication.

12. The method according to claim 10, wherein the parsing step comprises the step of dividing the management information data into specific character strings, indexes or a combination thereof.

13. The method according to claim 10, wherein the filtering step comprises the step of removing management information data when a specific field value of the management information data is a specific character string and the management information data is collected in a specific time range according to the filtering rule.

14. The method according to claim 10, wherein the transmitting step comprises the step of transmitting each unit of management information data to the destination integrated management solution through TCP socket communication.

15. The method according to claim 10, wherein the managing step comprises the step of monitoring processes on a chart or graph in a specific period through a graphic user interface (GUI).

16. A non-transitory computer-readable recording medium having a program recorded thereon which when executed on a computer performs a method for monitoring processes using collecting, converting, and transmitting devices in a real time so that a destination integrated management solution manages management information data from at least one source management solution in an integrated manner, the method comprising:
(a) a receiving step of collecting the management information data as a character string from the at least one source management solution;
(b) a parsing step of dividing the collected management information data into specific units according to a prescribed parsing rule, and inserting a specific field name into each divided unit in addition to the management information data in each divided unit so that the management information data is recognized by the destination integrated management solution;
(c) a filtering step of removing the management information data when a specific field value of the management information data is a specific character string and the management information data is collected in a specific time range according to a prescribed filtering rule, after the parsing step;
(d) a mapping step of modifying a value of a field of the management information data to map a field of the destination integrated management solution according to a prescribed mapping rule, after the parsing step or the filtering step;
(e) a transmitting step of transmitting the management information data to the destination integrated management solution, after at least one of the parsing, filtering or mapping steps; and
(f) a managing step of monitoring collection, conversion, and transmission of the management information data in real time using at least one or a combination of the parsing, filtering and mapping steps according to the management information data, and wherein the managing step comprises the step of resetting the parsing, filtering and mapping rules when an integrated management policy is changed.

* * * * *